US011364562B2

(12) United States Patent
Yang (10) Patent No.: US 11,364,562 B2
(45) Date of Patent: Jun. 21, 2022

(54) WELDING TORCH (71) Applicant: Taehan Yang, Incheon (KR)

(72) Inventor: Taehan Yang, Incheon (KR)

(*) Notice: Subject to any disclaimer, the term of this patent is extended or adjusted under 35 U.S.C. 154(b) by 337 days.

(21) Appl. No.: 16/495,331

(22) PCT Filed: Mar. 16, 2018

(86) PCT No.: PCT/KR2018/003113
§ 371 (c)(1),
(2) Date: Sep. 18, 2019

(87) PCT Pub. No.: WO2018/174479
PCT Pub. Date: Sep. 27, 2018

(65) Prior Publication Data
US 2020/0094345 A1 Mar. 26, 2020

(30) Foreign Application Priority Data

Mar. 20, 2017 (KR) .................. 10-2017-0034425
Jan. 9, 2018 (KR) .................. 10-2018-0002562

(51) Int. Cl.
B23K 9/29 (2006.01)
B23K 9/167 (2006.01)
B23K 9/26 (2006.01)
B23K 9/32 (2006.01)
B23K 37/00 (2006.01)

(52) U.S. Cl.
CPC ............. *B23K 9/296* (2013.01); *B23K 9/167* (2013.01); *B23K 9/26* (2013.01); *B23K 9/323* (2013.01); *B23K 37/003* (2013.01)

(58) Field of Classification Search
CPC .......... B23K 9/296; B23K 9/167; B23K 9/26; B23K 9/323; B23K 37/003
See application file for complete search history.

(56) References Cited

U.S. PATENT DOCUMENTS

| 4,300,034 A * | 11/1981 | Schneider | B23K 9/296 219/137.42 |
| 5,968,037 A * | 10/1999 | Rizoiu | B23K 26/146 606/13 |
| 2004/0050824 A1 * | 3/2004 | Samler | B23K 9/296 219/75 |
| 2013/0277337 A1 * | 10/2013 | Murata | B23K 9/164 219/74 |

FOREIGN PATENT DOCUMENTS

| JP | 2012086247 | 5/2012 |
| KR | 20090070579 | 7/2009 |
| KR | 20140132754 | 11/2014 |

* cited by examiner

*Primary Examiner* — Brian W Jennison
(74) *Attorney, Agent, or Firm* — IPLA P.A.

(57) ABSTRACT

A welding torch that comprises: a main body that is formed as a hollow pipe body, and that has a first inclined surface formed inside the pipe body; an electrode bar cap that has a collet chuck on the front side of a joint that is assembled on one side of the pipe body in a screw-coupling manner, that moves the collet chuck by tightening or loosening the joint; a head that has a socket that is arranged on a side facing the pipe body and that sprays supplied gas in all directions, and that is formed of a nozzle that is assembled on an external surface of the socket; and a connector that guides a gas supply into the pipe body.

17 Claims, 6 Drawing Sheets

WELDING TORCH

BACKGROUND

The present invention relates to a welding torch, and more particularly, to a welding torch, which can simply connect gas and a power cable with each other while smoothly supplying inert gas, such as argon and helium, and a power supply for arcing between an electrode bar and a base metal.

In general, welding has been widely used in the manner of electric welding, gas welding and others, and TIG welding using electricity and gas at the same time arcs by supplying electric power between an electrode bar and a base metal in inert gas, such as argon and helium, in order to weld the base metal. The TIG welding is used for welding thick sheet metals, such as steel for low temperature use and heat-resisting alloys, and is suitable for welding of high toughness and high intensity since being small in quantity of gaseous components and providing a welded part with purity and high quality.

Such TIG welding uses a torch for supplying gas and electric power. The torch for welding includes a nozzle, which arcs when an electrode bar made of tungsten is inserted into the nozzle to generate spark for welding, a cable connected to supply inert gas and electric power, and a main body which is a handle for welding.

For instance, Korean Patent Publication No. 10-2009-0070579 discloses a torch for welding, which includes a head part, a main body part, and a holder part. The holder part has a plurality of ventilation holes formed in a lower peripheral surface of the holder part. The ventilation holes are slantly formed in the peripheral surface of the holder part to be inclined, and a supply pipe connected inside the welding bar to correspond to the ventilation holes formed in the lower portion of the holder part in order to supply argon gas, electric power, cooling water and others extend to the position where the ventilation holes are formed.

However, the conventional welding torch has technical problems to be solved. The conventional welding torch has several problems in that a worker using the torch must have one or more torches having tip sizes available according to welding targets and welding areas since torches are standardized to have nozzles with different tip sizes according to welding targets and welding areas, and in that it requires an additional cost since the worker must have another torch suitable for a welding target or a welding area if the welding target and the welding area are changed, so serviceability is remarkably deteriorated.

Moreover, the electrode bar for arcing is inserted into the torch while being supported by a collet chuck. However, because the electrode bar has a structure that a support area is normally in a point contact, if a high heat is generated, a supported portion of the electrode bar which is in a point contact is thermally deformed to deteriorate bearing power. So, the conventional welding torch has a structural problem that the electrode bar hinders easy welding since the electrode bar may be moved during welding.

Furthermore, because the conventional torch has a structure that gas sprayed toward the nozzle of the torch is sprayed forward in a straight line, arc sparks are directly generated inside the nozzle, so the nozzle is easily heated to high temperature and the heat is easily transferred to a main body. So, worse, it may cause accidents, such as the worker's burn or outbreak of fire, and the worker cannot perform welding continuously.

SUMMARY OF THE INVENTION

Accordingly, the present invention has been made in view of the above-mentioned problems occurring in the prior art, and it is an object of the present invention to provide a welding torch, which allows a worker to use one torch to cope with welding targets and welding areas without the need to use different torches having nozzles with tip sizes suitable for welding targets and welding areas, and has nozzles replaceable according to welding targets and welding areas, thereby preventing additional expenses.

It is another object of the present invention to provide a welding torch which minimizes thermal deformation of a support portion of an electrode bar for arcing, thereby preventing deterioration of bearing power and inhibiting movement of the electrode bar to make welding easy.

It is a further object of the present invention to provide a welding torch which can perform its own cooling function using gas supplied to the torch, thereby allowing a worker to continuously perform welding and preventing accidents, such as the worker's burn or fire by lowering heat conductivity.

To accomplish the above object, according to the present invention, there is provided a welding torch including: a main body having a hollow body pipe and a first inclined surface formed in the body pipe; an electrode bar cap having a collet chuck disposed in front of a joint screw-coupled with one side of the body pipe, wherein the collet chuck is moved when the joint is tightened or released in such a way that the electrode bar is tightened when the collect chuck gets in contact with the first inclined surface and is released when being separated from the first inclined surface so as to adjust the length of the electrode bar; a head disposed at the opposite side of the body pipe and having a socket for spraying supplied gas in all directions and a nozzle assembled to the outer surface of the socket; and a connector guiding a gas supply to the body pipe and being electrically connected for ignition and welding, wherein some of the gas sprayed in all directions from the inside of the nozzle through the socket gets in contact with the nozzle to cool heat during welding.

As described above, the welding torch according to the present invention enhances versatile application of the torch since nozzles with different tip sizes corresponding to welding targets and welding areas are replaceable through sockets formed according to standardized sizes of the nozzles in order to cope with different welding targets and welding areas, and does not cause additional cost since just the tip size is easily changed if the welding target and welding area are changed.

Moreover, the welding torch according to the present invention has an improved structure having a collet chuck for supporting the electrode bar for arcing to be supported to the torch in a surface contact type. So, the welding torch according to the present invention can prevent deterioration of bearing power since the support area of the electrode bar gets wider by a collet chuck of a surface contact type and the support portion of the electrode bar is not easily deformed by high heat, prevents deterioration of bearing power and inhibits movement of the electrode bar to make welding easy.

Furthermore, the welding torch according to the present invention has a slant jet orifice for spraying gas to the inner wall of the nozzle and performing cooling. Therefore, the welding torch according to the present invention provides its own cooling function to allow the worker to continuously perform welding and prevents accidents, such as the worker's burn or fire by lowering heat conductivity.

DETAILED DESCRIPTION OF THE INVENTION

Figure 1:
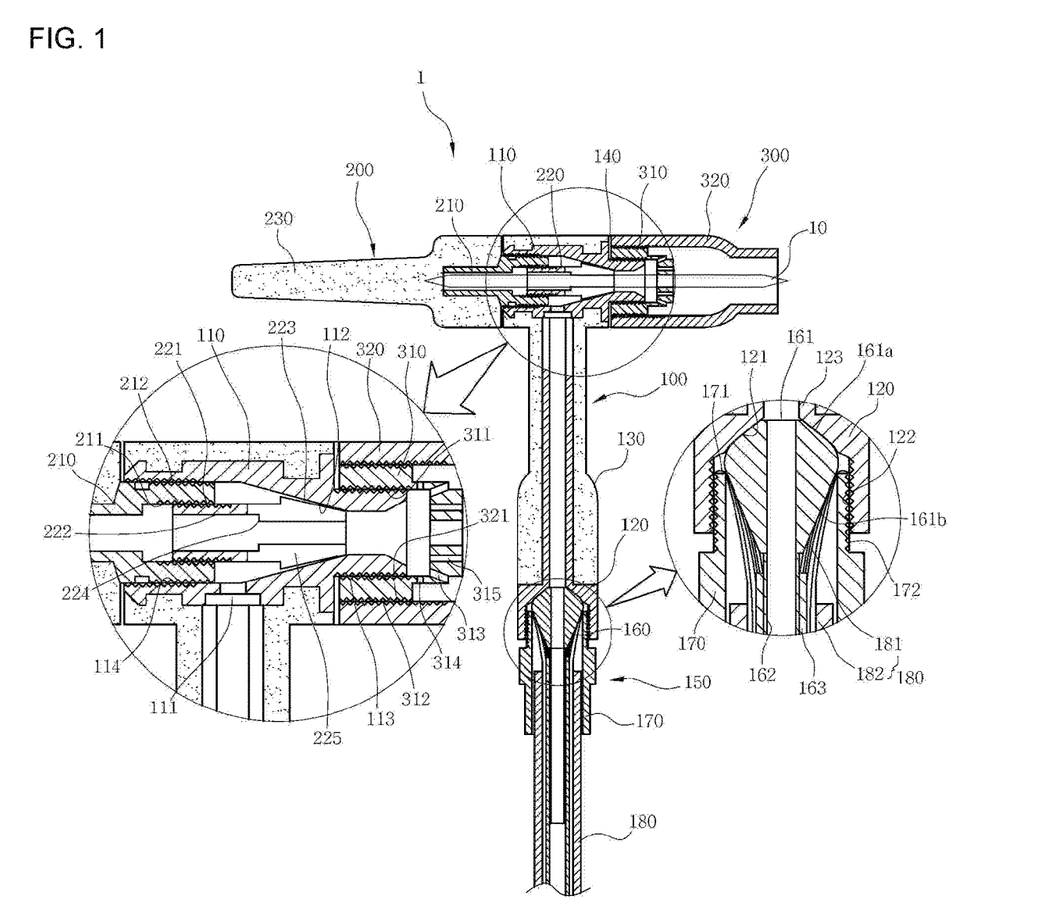
FIGS. 1 and 2 are sectional views showing a welding torch according to a first preferred embodiment of the present invention.
Figure 2:
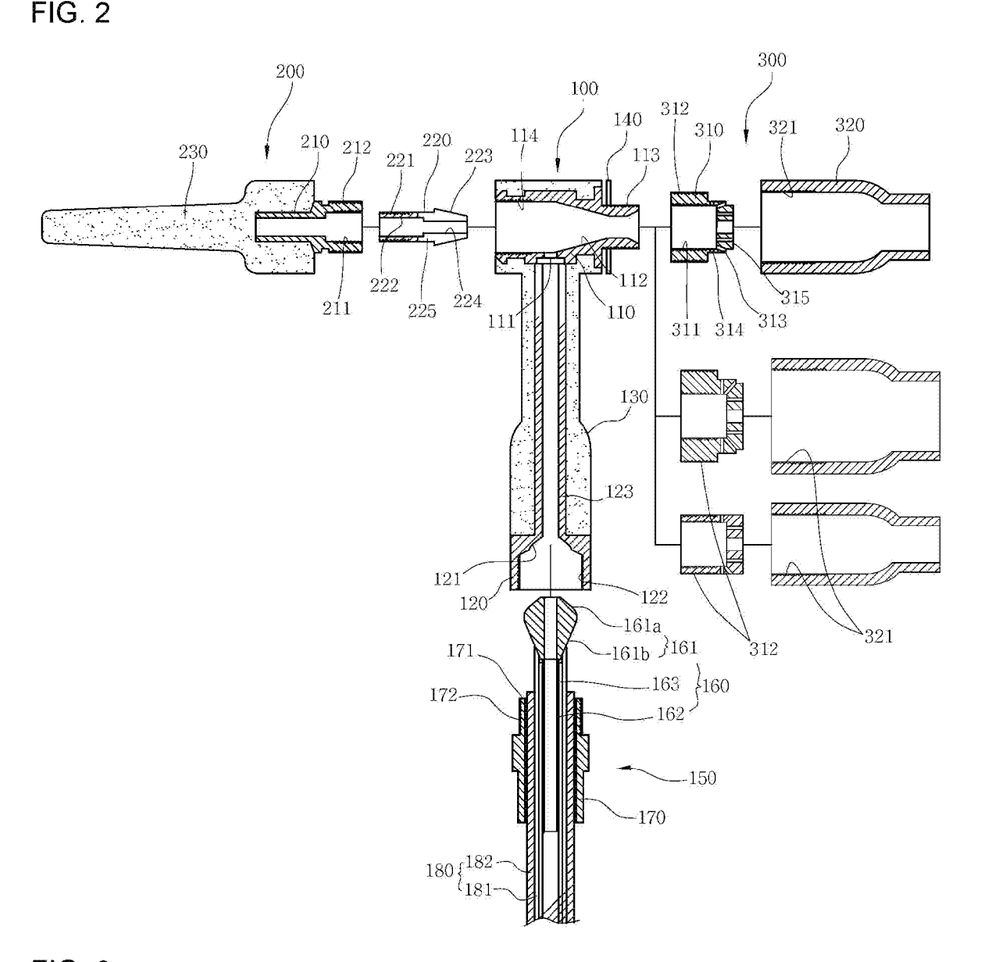

FIGS. 1 and 2 are views showing a welding torch according to a first preferred embodiment of the present invention.

In brief, the torch 1 according to the present invention includes: a main body 100 to which gas and electric power are supplied; an electrode bar cap 200 for supporting and fixing an electrode bar 10 when the electrode bar 10 is adjusted in its protrusion length; and a head 300 for generating sparks for performing welding using the supplied gas and electric power and making one of a plurality of nozzles 320 replaceable from one torch 1.

Hereinafter, referring to FIGS. 1 and 2, components of the welding torch according to the first preferred embodiment of the present invention will be described in detail. FIG. 1 is a side sectional view of the torch, and FIG. 2 is an exploded view of the torch.

First, the main body 100 includes: a hollow body pipe 110; a first inclined surface 112 formed inside the body pipe 110 to get narrower frontward; and a second connecting pipe 120 connected to an inner space of the body pipe 110 to supply gas and electric power.

The main body 100 according to the first preferred embodiment of the present invention includes the body pipe 110, the second connecting pipe 120, a first cover 130, a partition ring 140, and a connector 150.

For instance, the body pipe 110 of the main body 100 includes a first male screw 113 formed on the outer face of the front to couple the head 300 with the body pipe 110, a first female screw 114 formed on the inner face of the rear to couple the electrode bar cap 200 with the body pipe, and the first inclined surface 112 formed in the middle to get narrower frontward.

The body pipe 110 is a hollow pipe and is made of a metal material with excellent electrical conductivity, and preferably, made of brass. The body pipe 110 has a flow passage 111 formed in a side wall in the middle of the body pipe to connect the second connecting pipe 120. The first inclined surface 112 is formed on the inner circumference adjacent to the flow passage 111. The first inclined surface 112 has a slant surface getting narrower frontward to induce Venturi effect, thereby increase a flow rate of gas introduced through the flow passage 111 to make a flow of gas smooth.

Moreover, the second connecting pipe 120 of the main body 100 includes: a duct line 123 connected to the inner space of the flow passage 111 of the body pipe 110; a second connection part 121 which is formed on the inner face to be inclined upwardly and to which a first connection part 161a of a first cable 160 is connected; and a second female screw 122 formed at a lower portion of the second connection part 121 to be coupled with a second male screw 172 of a first connecting pipe 170. The second connecting pipe 120 supplies gas and electric power of first and second cables 160 and 180 connected through the connector 150.

The second connecting pipe 120 which is a hollow pipeline is made of the same material as the body pipe 110 and extends from the duct line 123 connected to the flow passage 111 of the body pipe 110 to provide a space allowing a worker, who performs welding, to grasp it with the hand. The second connection part 121 is formed on the inner part of the lower portion of the second connecting pipe 120, namely, on the second female screw 122, to be inclined upwardly. The second connection part 121 is preferably an inclined surface of a round shape to surround the first connection part 161a of the first cable 160 and to perfectly get in contact with the first connection part. The second connection part 121 is connected with the duct line 123 so that the supplied gas is introduced into the flow passage 111 of the body pipe 110 through the duct line 123.

Additionally, the first cover 130 of the main body 100 has an insulation function by surrounding the body pipe 110 and the second connecting pipe 120.

The first cover 130 is formed to surround the entire of the body pipe 110 and the second connecting pipe 120 to an arbitrary thickness and is made of a nonmetallic material, such as rubber or urethane, in order to insulate supplied electric power and heat generated during welding. The first cover 130 is a part that the worker grasps with the hand.

In addition, the partition ring 140 of the main body 100 is made of a nonmetallic material with low heat conductivity and is inserted into a portion where a socket 310 of the head 300 is assembled in order to delay heat conduction time from the head 300.

The partition ring 140 is made with a round plate material of which the center is perforated so that the first male screw 113 of the body pipe 110 is forcedly coupled to the partition ring 140, preferably, is made of synthetic resin for thermal insulation. The partition ring 140 partitions the socket 310 assembled to the first male screw 113 from the body pipe 110 so as to delay heat transferred from the head 300.

Moreover, the first cable 160 through which gas is introduced and the second cable 180 through which electricity flows are connected with each other coaxially. The connector 150 connects the first cable 160 and the second cable 180, which are connected with each other coaxially, to the second connecting pipe 120 of the main body 100 in order to supply gas and electric power to the main body 100.

The connector 150 functions to connect the first cable 160 and the second cable 180, which are connected with each other coaxially, to the body pipe 110 at the same time.

Here, the connector 150 includes: the first cable 160 having a head 161, a connection rod 162 protruding below the head 161, and a first hose 163 connected to the connection rod 162 to supply gas to the torch 1, wherein the head 161 has the first connection part 161a disposed at an upper portion as the upward inclined surface and connected to the second connection part 121, which is formed on the inner face of the second connecting pipe 120, and a first pressing part 161b formed at a lower portion of the first connection part as a downward inclined surface; the second cable 180 having a conducting wire 181 of which the middle part is fit and connected to the first hose 163 coaxially, wherein the conducting wire 181 is electrically connected to the second connecting pipe 120 to supply electric power to the torch 1; and the first connecting pipe 170 having a second male screw 172, which is coupled with a second female screw 122 formed on the inner face of the second connecting pipe 120 when the first and second cables 160 and 180 are inserted into the center of the first connecting pipe 170 coaxially, and a second pressing part 171, which is formed at an upper portion of the second male screw 172 and pushes the head of the first cable 160 so that the first connection part 170 and the second connection part 120 come into contact with each other to connect the first cable 160 and a conducting wire 181 is fit between the first pressing part 161b and the second pressing part 171 to connect the second cable 180 to the first connecting pipe 170.

The head 161 and the connection rod 162 formed at the lower portion of the head 161 of the first cable 160 are made of brass. The head 161 has the first connection part 161a formed at the upper portion as the upward inclined surface, and the first pressing part 161b formed at the lower portion of the first connection part 161a is formed as the downward inclined surface. The connection rod 162 located at the lower end of the first pressing part 161b is connected to the central pipe line of the head 161. The first hose 163 for supplying gas is forcedly fit to the outer circumference of the connection rod 162 so that gas is introduced into the first connecting pipe 170 through the connection rod 162 and the head 161.

The second cable 180 has a second hose 182 disposed on the outer circumference of the conducting wire 181 through which electricity flows, and the first hose 163 is inserted into the center of the conducting wire 181, so that the first cable 160 and the second cable 180 are formed coaxially as one line. An end portion of the conducting wire 181 is located to the head 161 of the first cable 160 to surround the first pressing part 161b.

The first connecting pipe 170 is a hollow pipe and is made of brass, and has the second male screw 172 formed on the outer circumference of the upper portion and coupled with the second female screw 122 of the second connecting pipe 120, and the second pressing part 171 formed at the upper end of the second male screw 172 as the downward inclined surface. When the first connecting pipe 170 is assembled to the second connecting pipe 120, the first pressing part 161b and the second pressing part 171 get in contact with each other by the inclined surfaces to generate pressing power, so that the conducting wire 181 inserted between the first pressing part 161b and the second pressing part 171 is pressed and fixed. Therefore, electricity of the conducting wire 181 flows to the body pipe 110 through the second connecting pipe 120.

In this instance, the rest part of the conducting wire 181 fixed and protruding between the first pressing part 161b and the second pressing part 171 is wound spirally on a coupled portion between the second female screw 122 and the second male screw 172 to be perfectly fixed.

Therefore, because the welding torch according to the present invention has a pipe line due to the connector 150 which connects the first cable 160 and the second cable 180 coaxially at the same time, the welding torch allows the worker to easily connect the cables for supplying gas and electric power and simplifies the whole structure, thereby enhancing productivity of the torch.

Furthermore, the welding torch according to the present invention has the structure that the conducting wire 181 of the second cable 180 for supplying electric power is fit and fixed between the first pressing part 161b and the second pressing part 171 to connect electricity. Therefore, because stress by movement during welding is not concentrated on the connected portion of the conducting wire 181, the conducting wire 181 is not cut easily, and the first cable 160 is entirely cut and another first cable is simply connected coaxially even if the conducting wire 181 is damaged by aging, thereby enhancing efficiency in maintenance.

Additionally, the electrode bar cap 200 includes a joint 210, a collet chuck 220, and a second cover 230. The collet chuck 220 is assembled in a state where the electrode bar 10 is inserted into the main body 100. The electrode bar 10 inserted into the collet chuck 220 is adjusted in its protruding length by an action that a second inclined part 223 disposed on the outer circumference of the collet chuck 220 gets in contact with the first inclined surface 112 and is pressed by the first inclined surface while the collet chuck 220 is assembled to the main body 100, and then, is supported and fixed.

For instance, the electrode bar cap 200 has the joint 210 for inducing a pressing action using the first inclined surface 112 inside the body pipe 110 when the collet chuck 220 is assembled into the body pipe 110 by being coupled to the body pipe 110 of the main body 100.

The joint 210 is a hollow pipe formed in such a way that a part of the electrode bar 10 is inserted into the body pipe 110, is coupled to the first female screw 114 disposed on the body pipe 110 of the main body 100 using a third male screw 212 formed on the outer circumference of the front. The joint 210 assembles the joint 210 and the collet chuck 220 with each other while a fourth male screw 221 of the collet chuck 220 is coupled to a third female screw 211 formed on the inner circumference of the third male screw 212. The joint 210 has a pipe part protruding from the rear of the joint to couple the second cover 230.

Moreover, the collet chuck 220 of the electrode bar cap 200 is assembled into the body pipe 110 of the main body 100 through the joint 210, and is fixed and supported after adjusting a protrusion length of the electrode bar 10 inserted into the body pipe 110 when pressing power acts while the collet chuck 220 gets in contact with the first inclined surface 112 of the body pipe 110.

Here, the collet chuck 220 includes: an insertion hole 222 formed therein so that the electrode bar 10 is inserted into the insertion hole 222; the second inclined part 223 formed through a fracture groove 225 formed forward radially from the insertion hole 222 to retract inwardly by the pressing action of the first inclined surface 112 disposed inside the body pipe 110 of the main body 100; and a contact part 224 having an inclined surface formed inside the second inclined part 223 to get wider forwardly, wherein the contact part 224 is supported to get in surface contact with the outer circumference of the electrode bar 10 to show fixation power.

In this instance, when the second inclined part 223 retracts, the second inclined part 223 gets in surface contact with the outer circumference of the electrode bar 100 widely by the inclined structure of the contact part 224 to enhance fixation power. The electrode bar 10 supported on the collet chuck 220 is a pin type bar having a sharp portion, and has been widely used for arch discharge. Therefore, its description will be omitted.

The welding torch according to the present invention can prevent deterioration of bearing power since the support area of the electrode bar 10 gets wider by the collet chuck of the surface contact type and the support portion of the electrode bar 10 is not easily deformed by high heat, and allows the worker to easily perform welding by inhibiting movement of the electrode bar 10.

Furthermore, the electrode bar cap 200 further includes the second cover 230, which is fixed to the rear of the joint 210 and adjusts pressing power so that the collect chuck 220 supports the electrode bar 10 while varying the position to be coupled to the main body 100 by spirally rotating the joint 210 along the third male screw 212 and the first female screw 114.

The second cover 230 has a bar shape and is coupled to the rear of the joint 210. Because the second cover 230 can rotate the joint 210, the position of the joint 210 coupled to the main body 100 is varied depending on the third male screw 212 and the second female screw 122, and pressing power is adjusted while the position of the second inclined part 223 of the collet chuck 220 gets in contact with the first inclined surface 112 of the body pipe 110 is varied. The adjustment of the pressing power increases or decreases bearing power of the electrode bar 10, so that the fixed position of the electrode bar 10 can be changed easily.

Additionally, the head 300 includes a plurality of nozzles 320, wherein one among the nozzles 320 is connected to the other end of the electrode bar cap 200 through a socket 310 so that the head generates sparks for welding using supplied gas and electric power. Each of the plurality of nozzles 320 has holes 321 with different diameters to cope with standardized tip sizes, a detachable part 312 with sizes to cope with the holes 321 to be assembled to the holes 321, so that one among the nozzles 320 is replaceable through the assembled structure of the holes 321 and the detachable part 312.

The head 300 according to the first preferred embodiment of the present invention includes the socket 310 and the nozzles 320.

For instance, the head 300 has the socket 310 for connecting the plurality of nozzles 320 having different diameters according to the standardized tip sizes to the main body 100.

The socket 310 is a hollow pipe and has the detachable part 312 formed spirally on the outer circumference thereof while varying in size according to the holes 321 with different diameters formed in the nozzles 320. A fourth female screw 311 which is coupled to the first male screw 113 of the main body 100 is formed on the inner circumference of the detachable part 312.

Here, the socket 310 further includes an inclined hole 313 inclined with respect to the inner wall of the nozzle 320 and a right-angled hole 314 formed at a right angle to the inner wall of the nozzle 320. The gas supplied to the main body 100 is sprayed to the inner wall through the inclined hole 313 and the right-angled hole 314 so that the cooling function of the nozzle 320 using gas can be performed.

The inclined hole 313 slantly sprays the gas supplied to the inner side wall of the nozzle 320 to cool the nozzle 320 by temperature of the gas, and the right-angled hole 314 orthogonally sprays the gas supplied to the inner side wall of the nozzle 320 to cool the nozzle 320 by temperature of the gas.

In this instance, the socket 310 further includes a side hole 315 formed at the front to spray gas frontward, and the side hole 315 smoothly supplies gas for arc discharge.

A user can select whether to use one among the inclined hole 313 and the side hole 315 or to use both of the inclined hole 313 and the side hole 315.

Therefore, the welding torch according to the present invention which includes the socket 310 having the inclined hole 313 and the right-angled hole 314 can allow the worker to continuously perform welding and prevent accidents, such as the worker's burn and fire by lowering heat conductivity since performing the cooling function.

In this instance, as shown in FIG. 2, the detachable part 312 is varied corresponding to the holes 321 with different diameters of the nozzle 320. So, the sockets 310 having the detachable parts 312 with different sizes are individually provided according to the sizes of the nozzles 320 so that the nozzles 320 can be replaced.

Therefore, the variable socket 310 to connect the plurality of nozzles 320 to one torch 1 is provided to cope with the standardized sizes of the nozzles 320, so that the nozzles 320 with different tip sizes corresponding to welding targets and welding areas can be replaced with another one in one torch 1. Therefore, the welding torch according to the present invention enhances versatile application since one among the plurality of nozzles 320 is replaced according to the welding targets and welding areas in one torch 1, and does not cause additional cost since just the tip size is simply changed in the torch 1, which is being used, if the welding target or the welding area is changed.

Moreover, the head 300 further includes the nozzle 320 which is a tip for generating sparks for arc discharge of the electrode bar 10 by supplying gas and electric power.

The nozzles 320 are hollow pipes and are made of a material with excellent thermal resistance, preferably, made of ceramic. The plurality of nozzles 320 have the spiral holes 321 with different diameters to cope with the standardized tip sizes, and one among the plurality of nozzles 320 can be replaced with another one in one torch through the assembled structure of the holes 321 and the detachable parts 312.

FIGS. 3 to 7 illustrate a welding torch according to a second preferred embodiment of the present invention.

Figure 3:
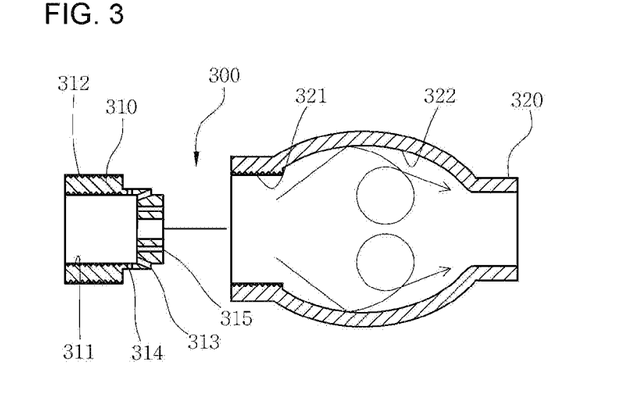
FIGS. 3 to 7 are sectional views showing a welding torch according to a second preferred embodiment of the present invention.

First, referring to FIG. 3, the welding torch according to the second preferred embodiment of the present invention will be described.

For instance, the head 300 of the welding torch 1 has a concave space part 322 which is formed on the side wall of the nozzle 320 to have a concave space in the nozzle 320 and forms a vortex when gas sprayed from the socket 310 collides against the concave space.

The concave space part 322 is a concave groove formed in the inner circumference of the side wall of the nozzle 320. The gas sprayed through the inclined hole 313 and the right-angled hole 314 of the socket 310 forms a vortex in the inner space of the nozzle 320 while colliding against the concave space part 322, and then, is discharged frontward from the nozzle 320, so that cooling efficiency using gas is enhanced by the vortex formed inside the nozzle 320 and outdoor air introduced from a front opening part of the nozzle 320 is blocked so as to enhance arc discharge efficiency.

Figure 4:
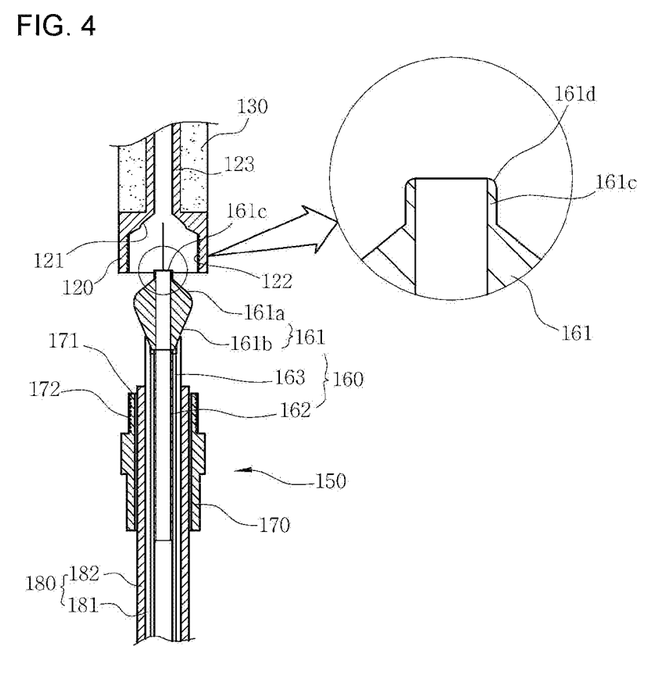

Furthermore, referring to FIG. 4, the connector 150 of the torch 1 is inserted into the duct line 123 of the second connecting pipe 120 and a protrusion 161c for maintaining sealability in supply of gas is formed at the upper end of the head 161 of the first cable 160.

The protrusion 161c has a hollow portion and protrudes integrally with the center of the upper end of the head 161 of the first cable 160 in a tube shape. The protrusion 161c has a size corresponding to a side of the duct line 123 of the second connecting pipe 120, and has a guide part 161d of a round shape formed on the upper end circumference of the protrusion 161c so as to be easily inserted into the duct line 123. It is preferable that the protrusion 161c be forcedly inserted into the duct line 123.

In this instance, because the protrusion 161c is fit into the duct line 123 and the head 161 is connected, the connected part of the duct line to which gas is supplied is formed double to maintain sealability to prevent a gas leak of the connected part using the connector 150.

Figure 5:
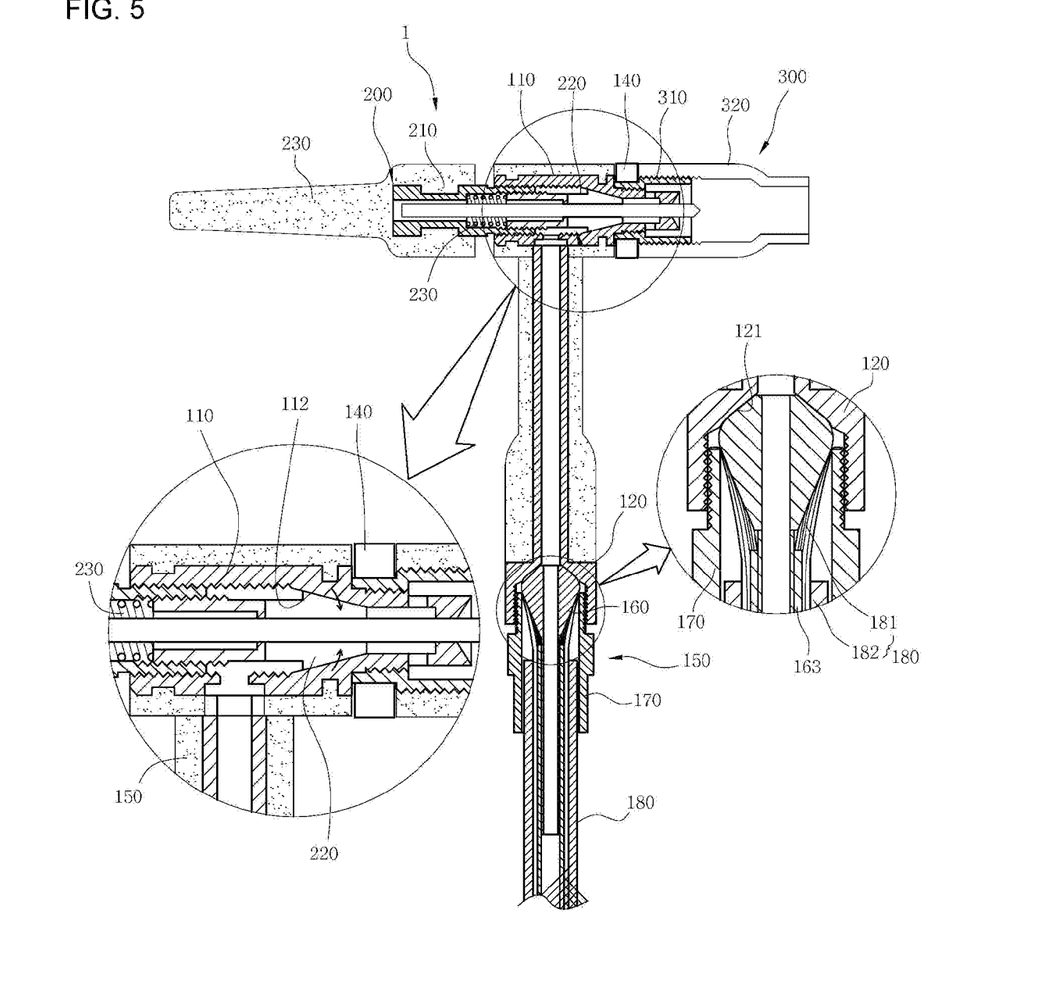
Figure 6:
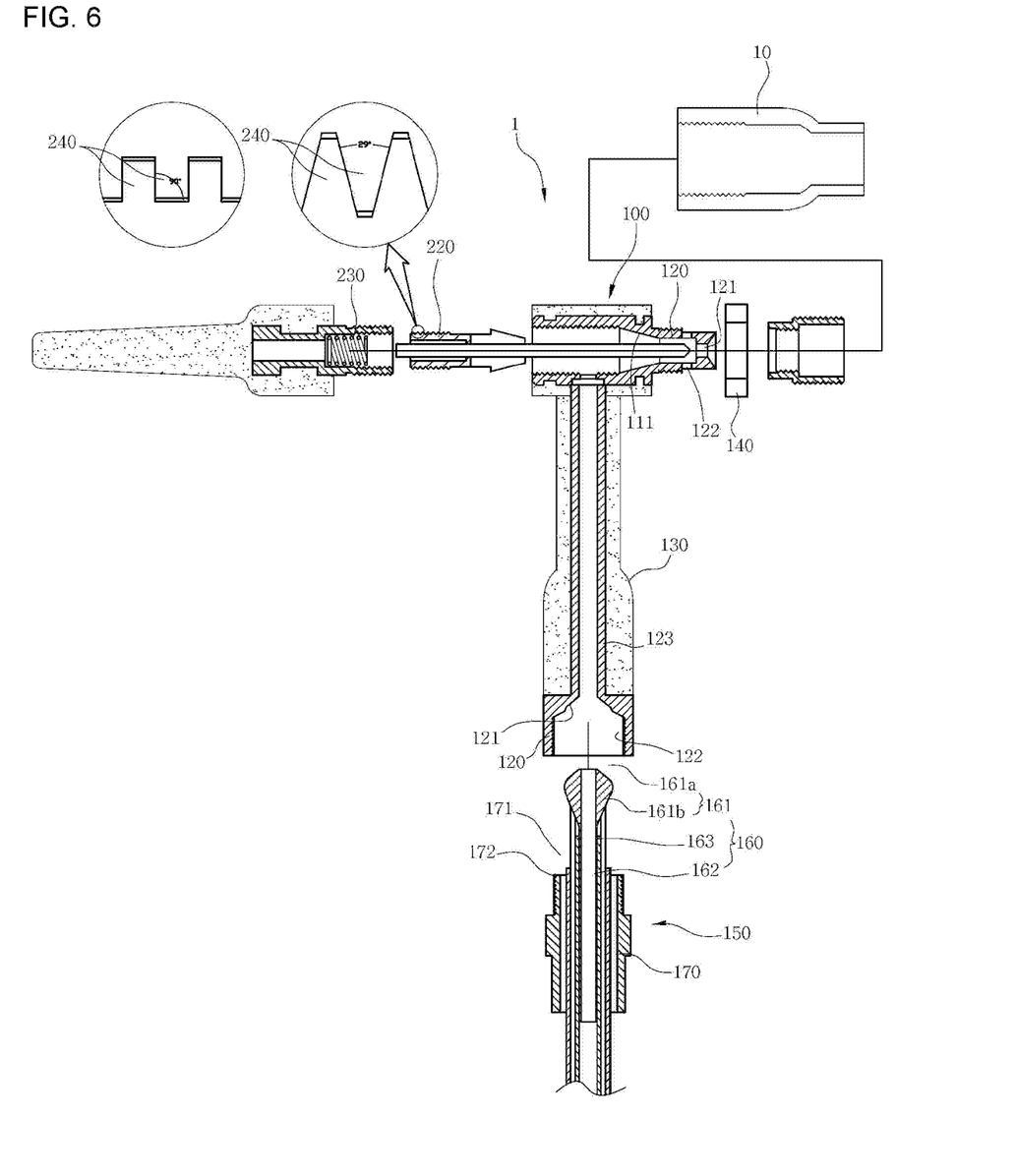

FIGS. 5 and 6 illustrate a welding torch according to another preferred embodiment of the present invention. In FIG. 5, the joint has an elastic member 230, namely, a spring, disposed inside the joint so that the collet chuck 220 gets in contact with the first inclined surface 112.

The joint further has a stepped jaw 212 disposed therein to support the elastic member, and in this instance, it is preferable that screw threads are formed as shown in FIG. 6, not formed in a triangular shape.

That is, a female screw formed on the inner surface of the joint and a male screw formed on the outer surface of the collet chuck are trapezoidal screws each of which the screw thread is formed at an angle of 29° to 30° or rectangular screws each of which the screw thread is formed at an angle of 90° in order to bear elastic force of the elastic member.

Figure 7:
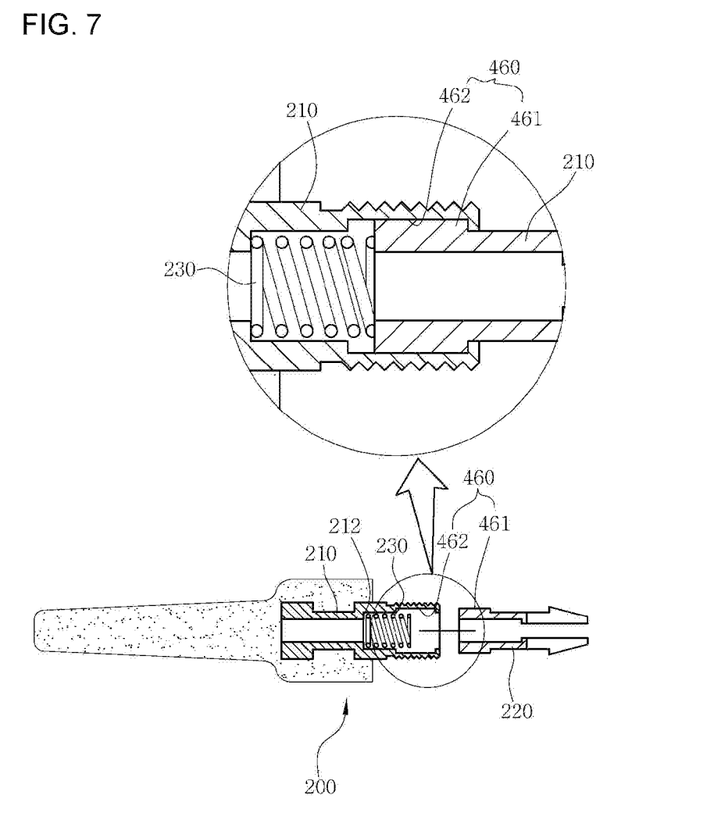

FIG. 7 illustrates a welding torch according to a further preferred embodiment of the present invention.

A retaining coupling part 460 is disposed on the collet chuck 220 in the welding torch 1 having the above structure.

The retaining coupling part 460 includes a retaining protrusion 461 protruding on the outer face of the rear of the collet chuck 220, and a retaining groove 462 formed to have a stepped jaw on the inner face of the front of the joint 210 in order to show bearing power having a retaining function when the retaining protrusion 461 is inserted.

In this instance, if the retaining coupling part 460 is used at the coupled part between the collet chuck 220 and the joint 210, the collet chuck 220 is retained and supported when the retaining protrusion 461 is inserted into the retaining groove 462 of the joint 210. So, the collet chuck 220 is not separated from the joint 210 and is freely moved forwardly and backwardly due to an available space of the retaining groove 462. Additionally, the collet chuck 220 maintains the state where it is pressed forwardly by elastic power of an elastic body 230 inserted between the collet chuck 220 and the joint 210 so that the first inclined surface 112 and the second inclined surface 223 come into contact in the same way. Because elastic power of the elastic body 230 increases or decreases according to the depth that the joint 210 is coupled to the body pipe 110, elastic power of the elastic body 230 can be easily adjusted.

For instance, in the state where the coupled part between the collet chuck 220 and the joint 210 is coupled using the retaining coupling part 460, the collet chuck 220 can be freely moved forwardly and backwardly. Therefore, if the collet chuck 220 moves by a clearance formed due to thermal expansion, the collet chuck 220 is continuously pressed forwardly by elastic power of the elastic body 230, and the clearance formed by thermal expansion is compensated by back-and-forth movement of the collet chuck 220 without deterioration in fixation power of the electrode bar 220 by the collet chuck 220.

The present invention relates to a welding torch which is connected with a welding machine for welding and is used for welding machine components, for welding in construction sites, and for welding pipes.

The invention claimed is:

1. A welding torch comprising:
a main body having a hollow body pipe and a first inclined surface formed in the body pipe;
an electrode bar cap having a collet chuck disposed in front of a joint screw-coupled with one side of the body pipe, wherein the collet chuck is moved when the joint is tightened or released in such a way that an electrode bar is tightened when the collect chuck gets in contact with the first inclined surface and is released from the first inclined surface so as to adjust the length of the electrode bar;
a head disposed at the opposite side of the body pipe and having a socket for spraying supplied gas in all directions and a nozzle assembled to the outer surface of the socket; and
a connector guiding a gas supply to the body pipe and being electrically connected for ignition and welding, wherein some of the gas sprayed in all directions from the inside of the nozzle through the socket gets in contact with the nozzle to cool heat during welding, wherein the connector includes:
a first cable having a head, a connection rod protruding below the head, and a first hose connected to the connection rod to supply gas to the torch, wherein the head has a first connection part disposed at an upper portion as an upward inclined surface and connected to a second connection part formed on the inner face of the second connecting pipe, and a first pressing part formed at a lower portion of the first connection part as a downward inclined surface;
a second cable having a conducting wire of which the middle part is fit and connected to the first hose coaxially, wherein the conducting wire is electrically connected to the second connecting pipe to supply electric power to the torch; and
a first connecting pipe having a second male screw, which is coupled with a second female screw formed on the inner face of the second connecting pipe when the first and second cables are inserted into the center of the first connecting pipe coaxially, and a second pressing part, which is formed at an upper portion of the second male screw and pushes the head of the first cable so that the first connection part and the second connection part come into contact with each other to connect the first cable and the conducting wire is fit between the first pressing part and the second pressing part to connect the second cable to the first connecting pipe.

2. A welding torch comprising:
a main body having a hollow body pipe, a first inclined surface formed in the body pipe to get frontward narrower, and a second connecting pipe connected to an inner space of the body pipe so that gas and electric power is supplied through the second connecting pipe;
an electrode bar cap having a collet chuck assembled into the main body, wherein an electrode bar is inserted into the collet chuck, and the electrode bar inserted into the collet chuck is adjusted in protrusion length and is supported and fixed by an action that a second inclined surface disposed on the outer circumference of the collet chuck gets in contact with the first inclined surface and is pressed by the first inclined surface while the collet chuck is assembled to the main body;
a head having one of a plurality of nozzles which is connected to the other end of the electrode bar cap using a socket in order to generate sparks for welding using gas or electric power supplied, wherein the nozzles have holes with different diameters to cope with standardized tip sizes and detachable parts having sizes corresponding to the holes to be assembled with the holes so that one of the nozzles are replaced with another one in one torch through the assembled structure of the holes and the detachable parts; and
a connector guiding a gas supply to the body pipe and being electrically connected for ignition and welding, wherein the connector includes:
a first cable having a head, a connection rod protruding below the head, and a first hose connected to the connection rod to supply gas to the torch, wherein the head has a first connection part disposed at an upper portion as an upward inclined surface and connected to a second connection part formed on the inner face of the second connecting pipe, and a first pressing part formed at a lower portion of the first connection part as a downward inclined surface;
a second cable having a conducting wire of which the middle part is fit and connected to the first hose coaxially, wherein the conducting wire is electrically connected to the second connecting pipe to supply electric power to the torch; and a first connecting pipe having a second male screw, which is coupled with a second female screw formed on the inner face of the second connecting pipe when the first and second cables are inserted into the center of the first connecting pipe coaxially, and a second pressing part, which is formed at an upper portion of the second male screw and pushes the head of the first cable so that the first connection part and the second connection part come into contact with each other to connect the first cable and the conducting wire is fit between the first pressing part and the second pressing part to connect the second cable to the first connecting pipe.

3. The welding torch according to claim 1, wherein the collet chuck includes: an insertion hole in which the electrode bar is inserted; a second inclined part formed through a fracture groove formed forward radially from the insertion hole to retract inwardly by the pressing action of the first inclined surface disposed inside the body pipe of the main body; and a contact part having an inclined surface formed inside the second inclined part to get wider forwardly, wherein the contact part is supported to get in surface contact with the outer circumference of the electrode bar to show fixation power.

4. The welding torch according to claim 1, wherein the socket is mounted to the body pipe integrally or sectionally.

5. The welding torch according to claim 1, wherein the socket has a fourth female screw formed on the inner face of the socket to be screw-coupled with a first male screw formed on the body pipe and a detachable screw disposed on the outer surface of the socket to be coupled with the nozzle.

6. The welding torch according to claim 4, wherein the socket has a right-angled hole for spraying gas toward the inner wall of the nozzle.

7. The welding torch according to claim 1, wherein the socket has an inclined hole formed to be inclined with respect to the inner wall of the nozzle and a right-angled hole formed at a right angle to the inner wall of the nozzle, and
wherein gas supplied to the main body through the inclined hole and the right-angled hole is sprayed toward the inner wall of the nozzle to perform cooling of the nozzle using gas.

8. The welding torch according to claim 1, wherein the main body further includes a partition ring, which is made of a nonmetallic material with low heat conductivity and is inserted into a portion where the socket of the head is assembled so as to delay heat conduction time from the head.

9. The welding torch according to claim 1, wherein an elastic member is disposed inside the joint to push the collet chuck in the direction of the first inclined surface so that the electrode bar is fixed stably.

10. The welding torch according to claim 9, wherein the elastic member is a spring.

11. The welding torch according to claim 1, wherein a joint is disposed to make the collet chuck inserted into the body pipe to get in contact with the first inclined surface, and the collet chuck and the joint have screw threads of a rectangular shape or a trapezoid shape.

12. The welding torch according to claim 2, wherein the collet chuck includes: an insertion hole in which the electrode bar is inserted; a second inclined part formed through a fracture groove formed forward radially from the insertion hole to retract inwardly by the pressing action of the first inclined surface disposed inside the body pipe of the main body; and a contact part having an inclined surface formed inside the second inclined part to get wider forwardly, wherein the contact part is supported to get in surface contact with the outer circumference of the electrode bar to show fixation power.

13. The welding torch according to claim 2, wherein the socket is mounted to the body pipe integrally or sectionally.

14. The welding torch according to claim 2, wherein the socket has a fourth female screw formed on the inner face of the socket to be screw-coupled with a first male screw formed on the body pipe and a detachable screw disposed on the outer surface of the socket to be coupled with the nozzle.

15. The welding torch according to claim 2, wherein the socket has an inclined hole formed to be inclined with respect to the inner wall of the nozzle and a right-angled hole formed at a right angle to the inner wall of the nozzle, and
wherein gas supplied to the main body through the inclined hole and the right-angled hole is sprayed toward the inner wall of the nozzle to perform cooling of the nozzle using gas.

16. The welding torch according to claim 2, wherein the main body further includes a partition ring, which is made of a nonmetallic material with low heat conductivity and is inserted into a portion where the socket of the head is assembled so as to delay heat conduction time from the head.

17. The welding torch according to claim 2, wherein a joint is disposed to make the collet chuck inserted into the body pipe to get in contact with the first inclined surface, and the collet chuck and the joint have screw threads of a rectangular shape or a trapezoid shape.

* * * * *